United States Patent
He et al.

(10) Patent No.: US 10,209,999 B2
(45) Date of Patent: Feb. 19, 2019

(54) DEVICES, UPDATERS, METHODS FOR CONTROLLING A DEVICE, AND METHODS FOR CONTROLLING AN UPDATER

(71) Applicant: Ping He, Singapore (SG)

(72) Inventors: Ping He, Singapore (SG); Tony Casano, Singapore (SG); Henky Jatmiko Gunawan, Singapore (SG)

(73) Assignee: RAZER (ASIA-PACIFIC) PTE. LTD., Singapore (SG)

( * ) Notice: Subject to any disclaimer, the term of this patent is extended or adjusted under 35 U.S.C. 154(b) by 0 days.

(21) Appl. No.: 15/103,775

(22) PCT Filed: Dec. 13, 2013

(86) PCT No.: PCT/US2013/074848
§ 371 (c)(1),
(2) Date: Jun. 10, 2016

(87) PCT Pub. No.: WO2015/088544
PCT Pub. Date: Jun. 18, 2015

(65) Prior Publication Data
US 2017/0024221 A1    Jan. 26, 2017

(51) Int. Cl.
*G06F 9/44*    (2018.01)
*G06F 13/10*    (2006.01)
(Continued)

(52) U.S. Cl.
CPC ............. *G06F 9/4403* (2013.01); *G06F 8/65* (2013.01); *G06F 8/654* (2018.02); *G06F 8/665* (2013.01);
(Continued)

(58) Field of Classification Search
CPC ................................. G06F 9/44; G06F 9/4406
See application file for complete search history.

(56) References Cited

U.S. PATENT DOCUMENTS 6,314,455 B1 * 11/2001 Cromer ............... G06F 11/1417
709/217
7,487,343 B1 * 2/2009 Insley ..................... G06F 9/441
713/1
(Continued)

FOREIGN PATENT DOCUMENTS

CN    101674267 A    3/2010

OTHER PUBLICATIONS

First Office Action dated Feb. 3, 2017 in corresponding Chinese Patent Application No. 201380082049.X.
(Continued)

*Primary Examiner* — Phil K Nguyen
(74) *Attorney, Agent, or Firm* — Polsinelli PC (57) ABSTRACT

According to various embodiments, a device may be provided. The device may include a bootloader; a memory configured to store firmware data for controlling the device; a processor configured to operate in a device operation mode or in a bootloader mode: and an interface. The device operation mode may be a mode in which the processor controls the bootloader to load the firmware data stored, in the memory. The bootloader mode may be a mode in which the processor controls the bootloader to send an identifier of the device using the interface, to receive firmware data using the interface and to store the firmware data in the memory.

18 Claims, 9 Drawing Sheets

(51) Int. Cl.
*G06F 9/4401* (2018.01)
*G06F 8/654* (2018.01)
*G06F 9/445* (2018.01)
*G06F 8/65* (2018.01)
*G06F 11/14* (2006.01)

(52) U.S. Cl.
CPC ........ *G06F 9/4401* (2013.01); *G06F 11/1433* (2013.01); *G06F 13/102* (2013.01)

(56) References Cited

U.S. PATENT DOCUMENTS

| | | | |
|---|---|---|---|
| 2003/0106052 A1* | 6/2003 | Morrison | G06F 8/65 717/170 |
| 2003/0217358 A1* | 11/2003 | Thurston | G06F 8/60 717/174 |
| 2005/0132179 A1* | 6/2005 | Glaum | G06F 8/68 713/1 |
| 2005/0160257 A1 | 7/2005 | Kruger et al. | |
| 2005/0229173 A1* | 10/2005 | Mihm | G06F 8/65 717/171 |
| 2005/0262337 A1 | 11/2005 | Ziesmer et al. | |
| 2008/0027587 A1* | 1/2008 | Nickerson | A01G 25/16 700/284 |
| 2008/0086652 A1* | 4/2008 | Krieger | G06F 1/26 713/330 |
| 2008/0165952 A1* | 7/2008 | Smith | G06F 21/57 380/28 |
| 2009/0037717 A1* | 2/2009 | Hanes | G06F 9/4416 713/2 |
| 2010/0199078 A1* | 8/2010 | Shih | G06F 8/65 713/2 |
| 2011/0083004 A1* | 4/2011 | Lipinski | G06F 11/0727 713/2 |
| 2012/0124567 A1 | 5/2012 | Landry | |
| 2012/0198435 A1 | 8/2012 | Dirstine et al. | |
| 2013/0031538 A1 | 1/2013 | Skalsky | |
| 2013/0139138 A1* | 5/2013 | Kakos | G06F 8/65 717/168 |
| 2013/0326493 A1 | 12/2013 | Poonamalli et al. | |
| 2014/0337611 A1* | 11/2014 | Kuscher | G06F 9/4401 713/100 |
| 2015/0280471 A1* | 10/2015 | Farhi | H02J 7/0004 320/107 |

OTHER PUBLICATIONS

Extended European Search Report dated Sep. 28, 2017 in corresponding European Patent Application No. 13898994.2, 9 pages.
Third Office Action dated Jan. 23, 2018 in related Chinese Patent Application No. 201380082049.X.

* cited by examiner

DEVICES, UPDATERS, METHODS FOR CONTROLLING A DEVICE, AND METHODS FOR CONTROLLING AN UPDATER

TECHNICAL FIELD

Various embodiments generally relate to devices, updaters, methods for controlling a device, and methods for controlling an updater.

BACKGROUND

Devices may require firmware in order to control their operation. This firmware may be desired to be updated.

SUMMARY OF THE INVENTION

According to various embodiments, a device may be provided. The device may include a bootloader; a memory configured to store firmware data for controlling the device; a processor configured to operate in a device operation mode or in a bootloader mode; and an interface. The device operation mode may be a mode in which the processor controls the bootloader to load the firmware data stored in the memory. The bootloader mode may be a mode in which the processor controls the bootloader to send an identifier of the device using the interface, to receive firmware data using the interface and to store the firmware data in the memory.

According to various embodiments, an updater may be provided. The updater may include: a receiver configured to receive from a device in a bootloader mode an identifier of the device; and a sender configured to send to the device firmware data based on the received identifier.

According to various embodiments, a method for controlling a device may be provided. The method may include: controlling a bootloader; controlling a memory to store firmware data for controlling the device; controlling a processor to operate in a device operation mode or in a bootloader mode; and controlling an interface. The device operation mode may be a mode in which the processor controls the bootloader to load the firmware data stored in the memory. The bootloader mode may be a mode in which the processor controls the bootloader to send an identifier of the device using the interface, to receive firmware data using the interface and to store the firmware data in the memory.

According to various embodiments, a method for controlling an updater may be provided. The method may include: controlling a receiver to receive from a device in a bootloader mode an identifier of the device; and controlling a sender to send to the device firmware data based on the received identifier.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. The dimensions of the various features or elements may be arbitrarily expanded or reduced for clarity. In the following description, various embodiments of the invention are described with reference to the following drawings, in which.

DETAILED DESCRIPTION

The following detailed description refers to the accompanying drawings that show, by way of illustration, specific details and embodiments in which the invention may be practiced. These embodiments are described in sufficient detail to enable those skilled in the art to practice the invention. Other embodiments may be utilized and structural, and logical changes may be made without departing from the scope of the invention. The various embodiments are not necessarily mutually exclusive, as some embodiments can be combined with one or more other embodiments to form new embodiments.

In order that the invention may be readily understood and put into practical effect, particular embodiments will now be described by way of examples and not limitations, and with reference to the figures.

The device may include a memory which is for example used in the processing carried out by the device. The updater may include a memory which is for example used in the processing carried out by the updater. A memory used in the embodiments may be a volatile memory, for example a DRAM (Dynamic Random Access Memory) or a non-volatile memory, for example a PROM (Programmable Read Only Memory), an EPROM (Erasable PROM), EEPROM (Electrically Erasable PROM), or a flash memory, e.g., a floating gate memory, a charge trapping memory, an MRAM (Magnetoresistive Random Access Memory) or a PCRAM (Phase Change Random Access Memory).

In an embodiment, a "circuit" may be understood as any kind of a logic implementing entity, which may be special purpose circuitry or a processor executing software stored in a memory, firmware, or any combination thereof. Thus, in an embodiment, a "circuit" may be a hard-wired logic circuit or a programmable logic circuit such as a programmable processor, e.g. a microprocessor (e.g. a Complex Instruction Set Computer (CISC) processor or a Reduced Instruction Set Computer (RISC) processor). A "circuit" may also be a processor executing software, e.g. any kind of computer program, e.g. a computer program using a virtual machine code such as e.g. Java. Any other kind of implementation of the respective functions which will be described in more detail below may also be understood as a "circuit" in accordance with an alternative embodiment. It will be understood that what is described herein as circuits with different names (for example "circuit A" and "circuit B") may also be provided in one physical circuit like described above.

Various embodiments are provided for devices, and various embodiments are provided for methods. It will be understood that basic properties of the devices also hold for the methods and vice versa. Therefore, for sake of brevity, duplicate description of such properties may be omitted.

It will be understood that any property described herein for a specific device may also hold for any device described herein. It will be understood that any property described herein for a specific method may also hold for any method described herein. Furthermore, it will be understand that for any device or method described herein, not necessarily all the components or steps described must be enclosed in the device or method, but only some (but not all) components or steps may be enclosed.

Devices may require firmware in order to control their operation. This firmware may be desired to be updated.

Figure 1:
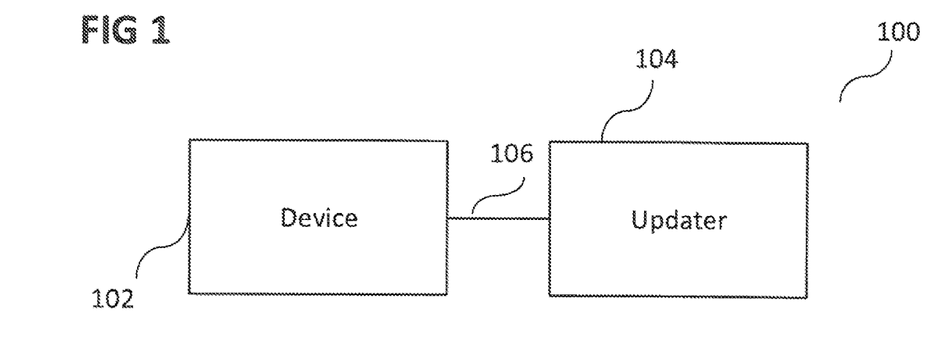
FIG. 1 shows a system of a device and an updater in accordance with an embodiment.

FIG. 1 shows a system 100 of a device 102 and an updater 104 in accordance with an embodiment. The device 102 may include firmware data which may be used for operating the device. The device 102 may desire to receive updated firmware data. The device 102 may receive the updated firmware data from an updater 104 via a connection 106.

Figure 2:
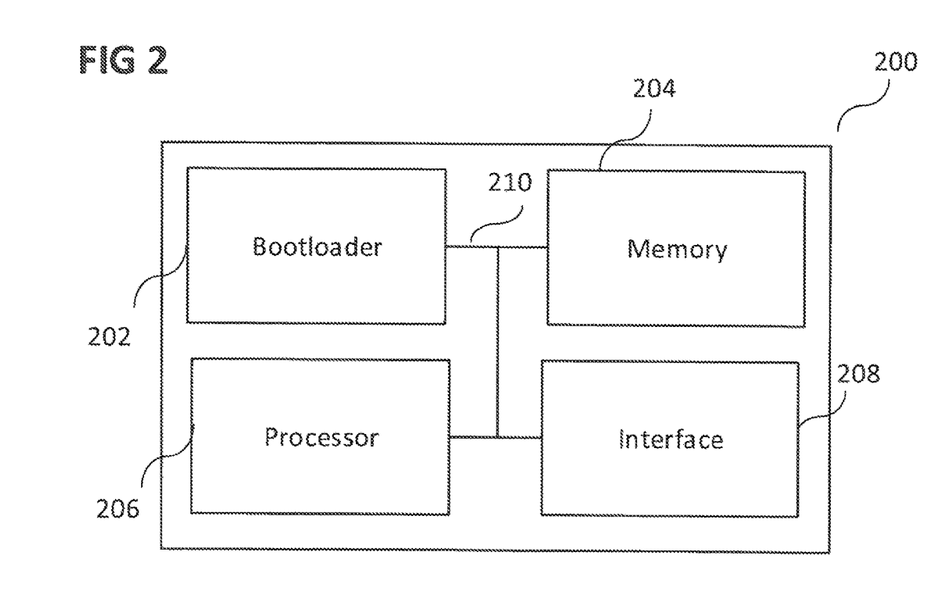
FIG. 2 shows a device in accordance with an embodiment.

FIG. 2 shows a device 200 in accordance with an embodiment. The device 200 may include a bootloader 202 (for example a bootloader circuit). The device 200 may further include a memory 204 configured to store firmware data for controlling the device 200. The device 200 may further include a processor 206 configured to operate in a device operation mode or in a bootloader mode. The device 200 may further include an interface 208 (for example to an updater like will be described below, for example the updater 400 of FIG. 4), for example an interface circuit. The device operation mode may be a mode in which the processor 206 controls the bootloader 202 to load the firmware data stored in the memory 204. The bootloader mode may be a mode in which the processor 206 controls the bootloader 202 to send an identifier of the device 200 using the interface 208 (for example to the updater), to receive firmware data using the interface 208 (for example from the updater) and to store the firmware data in the memory 204. The bootloader 202, the memory 204, the processor 206, and the interface 208 may be connected via a connection 210 (or a plurality of separate connections), for example an electrical or optical connection, for example any kind of cable or bus.

The device 200 may include or may be an input device and/or an output device.

The firmware data may include or may be data for controlling the input device and/or the output device.

The bootloader mode may be a mode in which the processor 206 does not control the bootloader 202 to load the firmware data stored in the memory 204.

The interface 208 may include or may be at least one of a universal serial bus (USB) interface, a Firewire interface, a PS/2 interface, a Thunderbolt interface, a local area network (LAN) interface, a Bluetooth interface, an infrared interface, a wireless local area network (WLAN) interface or a mobile radio communication interface.

The bootloader may use data stored in a secured portion of the memory.

Figure 3:
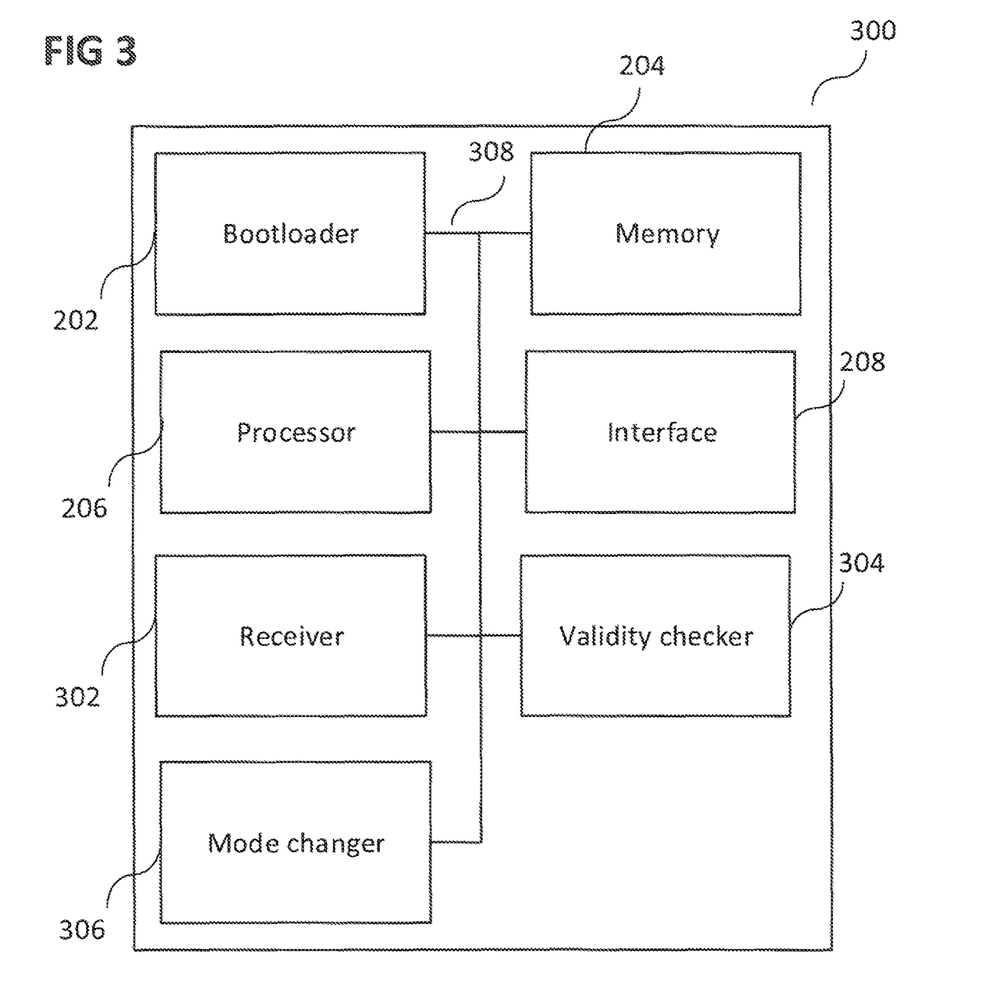
FIG. 3 shows a device in accordance with an embodiment.

FIG. 3 shows a device 300 in accordance with an embodiment. The device 300 may, similar to the device 200 of FIG. 2, include a bootloader 202. The device 300 may, similar to the device 200 of FIG. 2, further include a memory 204. The device 300 may, similar to the device 200 of FIG. 2, further include a processor 206. The device 300 may, similar to the device 200 of FIG. 2, further include an interface 208. The device 300 may further include a receiver 302 (for example a receiver circuit), like will be described below. The device 300 may further include a validity checker 304 (for example a validity checking circuit), like will be described below.

The device 300 may further include a mode changer 306 (for example a mode changing circuit), like will be described below. The bootloader 202, the memory 204, the processor 206, the interface 208, the receiver 302, the validity checker 304, and the mode changer 306 may be connected via a connection 308 (or a plurality of separate connections), for example an electrical or optical connection, for example any kind of cable or bus.

The receiver 302 may be configured to receive an instruction to change from the device operation mode to the bootloader mode. The receiver 302 may be configured to receive the instruction using the interface 208.

The receiver 302 may be configured to receive an instruction to change from the bootloader mode to the device operation mode. The receiver 302 may be configured to receive the instruction using the interface 208.

The validity checker 304 may be configured to check whether the firmware data stored in the memory 204 is valid. The mode changer 306 may be configured to change from the device operation mode to the bootloader mode if it is determined that the firmware data stored in the memory 204 is not valid.

The device 300 may further be configured to determine in which mode to operate at the time of booting the device 300.

Figure 4:
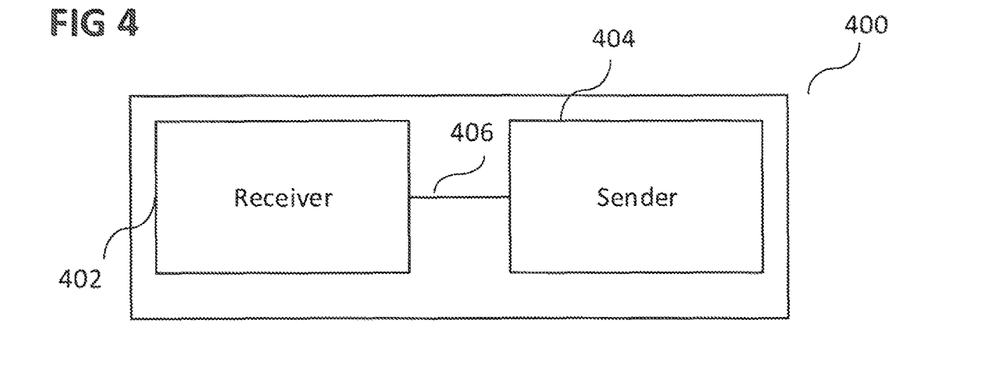
FIG. 4 shows an updater in accordance with an embodiment.

FIG. 4 shows an updater 400 in accordance with an embodiment. The updater 400 may include a receiver 402 (for example a receiver circuit) configured to receive from a device (for example from the device 200 of FIG. 2 or the device 300 of FIG. 3) in a bootloader mode an identifier of the device. The updater 400 may further include a sender 404 (for example a sender circuit) configured to send to the device firmware data based on the received identifier. The receiver 402 and the sender 404 may be connected via a connection 406 (or a plurality of separate connections), for example an electrical or optical connection, for example any kind of cable or bus.

The sender 404 may further be configured to send to a device not in the bootloader mode an instruction for changing to the bootloader mode.

The sender 404 may further be configured to send to the device in the bootloader mode an instruction for changing to a device operation mode.

Figure 5:
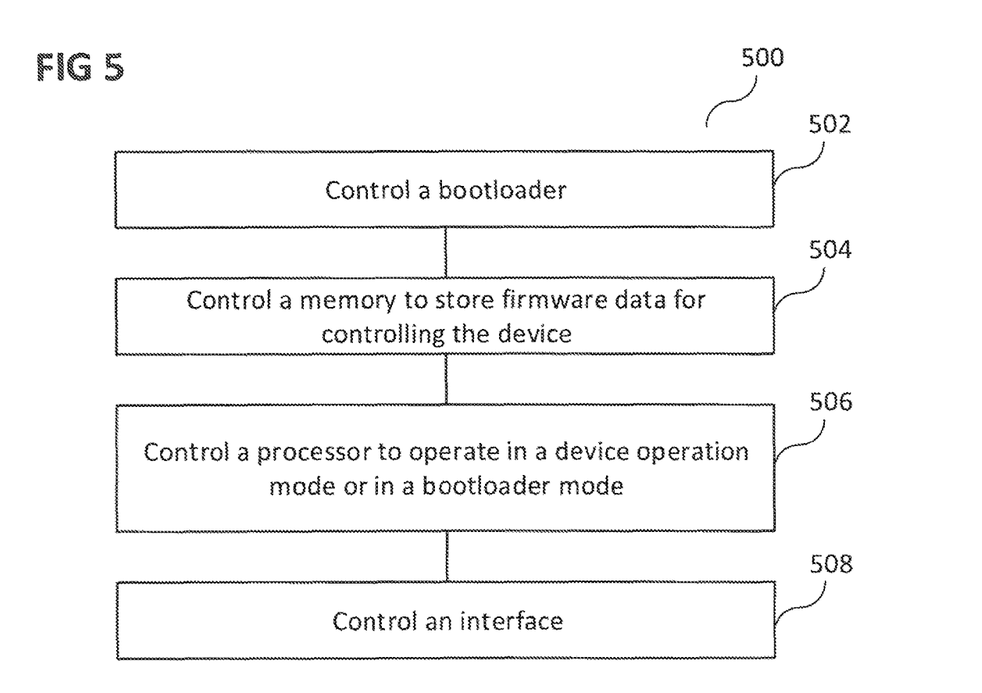
FIG. 5 shows a flow diagram illustrating a method for controlling a device in accordance with an embodiment.

FIG. 5 shows a flow diagram 500 illustrating a method for controlling a device in accordance with an embodiment. In 502, a bootloader may be controlled. In 504, a memory may be controlled to store firmware data for controlling the device. In 506, a processor may be controlled to operate in a device operation mode or in a bootloader mode. In 508, an interface may be controlled. The device operation mode may be a mode in which the processor controls the bootloader to load the firmware data stored in the memory. The bootloader mode may be a mode in which the processor controls the bootloader to send an identifier of the device using the interface, to receive firmware data using the interface and to store the firmware data in the memory.

The device may include or may be an input device and/or an output device.

The firmware data may include or may be data for controlling the input device and/or the output device.

The bootloader mode may be a mode in which the processor does not control the bootloader to load the firmware data stored in the memory.

The interface may include at least one of a universal serial bus interface, a Firewire interface, a PS/2 interface, a Thunderbolt interface, a local area network interface, a Bluetooth interface, an infrared interface, a wireless local area network interface or a mobile radio communication interface.

The bootloader may use data stored in a secured portion of the memory.

The method may further include controlling a receiver to receive an instruction to change from the device operation mode to the bootloader mode.

The receiver may receive the instruction using the interface.

The method may further include controlling a receiver to receive an instruction to change from the bootloader mode to the device operation mode.

The receiver may receive the instruction using the interface.

The method may further include: controlling a validity checker to check whether the firmware data stored in the memory is valid; and controlling a mode changer to change from the device operation mode to the bootloader mode if it is determined that the firmware data stored in the memory is not valid.

The device may determine in which mode to operate at the time of booting the device.

Figure 6:
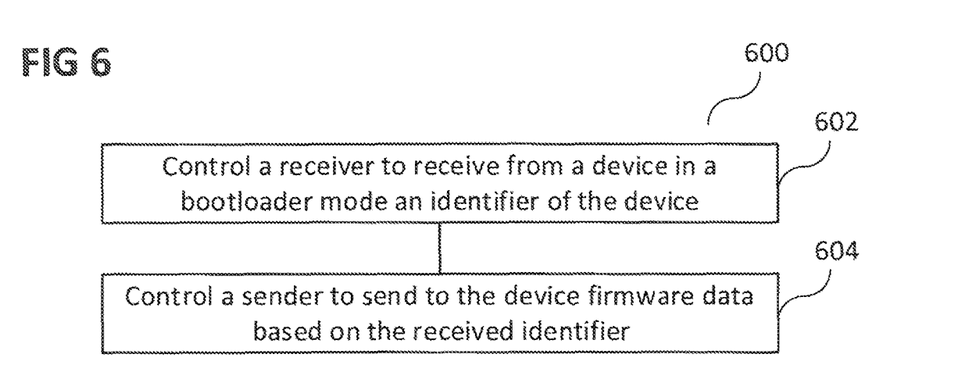
FIG. 6 shows a flow diagram illustrating a method for controlling an updater in accordance with an embodiment.

FIG. 6 shows a flow diagram 600 illustrating a method for controlling an updater in accordance with an embodiment. In 602, a receiver may be controlled to receive from a device in a bootloader mode an identifier of the device. In 604, a sender may be controlled to send to the device firmware data based on the received identifier.

The sender may send to a device not in the bootloader mode an instruction for changing to the bootloader mode.

The sender may send to the device in the bootloader mode an instruction for changing to a device operation mode.

According to various embodiments, a firmware bootloader and an updater may be provided.

According to various embodiments, a mechanism to determine the identity of devices which encounter firmware update failures and revive them automatically may be provided.

Commonly used updaters may be generic and it may be possible to flash in devices with the wrong firmware. Furthermore, firmware update failures may render the device unusable.

According to various embodiments, a bootloader may be provided so that firmware failures may cause the device to show itself as a bootloader device. According to various embodiments, the target hardware ID (identifier) may be exposed through the bootloader. According to various embodiments, a monitor device (which may be referred to as an updater), which may include software, may be built to detect devices in bootloader mode and automatically flash them with a matching firmware.

Once the bootloader is designed to expose itself and declare what is the target PID (product ID), the monitor device (i.e. updater) may be able to detect firmware update failures and automatically flash in a firmware (in other words: firmware data) that is suitable for that device. During normal operations, the updater may now determine the identity of the device in bootloader mode and therefore may ensure that only a matching firmware is flashed into the device.

According to various embodiments, an updater may be provided to automatically flash in a matching firmware to a device.

In previously used bootloaders, it may not be possible to determine what the identity of device in bootloader mode is. It may be determined that there is a device that needs to be updated, but it may not be determined what device it is physically. It may have to be relied on the user to pick the right firmware updater for his device. Once a firmware update failure occurs, the user may be desired to be requested to manually run the firmware updater again.

According to various embodiments, such user intervention may not be required, and the device may be revived automatically.

In the following, communication between a device and an operating system (OS) will be described.

According to various embodiments, various devices may have several BootBlock and Bootloader requirements. The term 'BootBlock' may refer to the protected firmware, which may include the very first piece of code executed until the BootBlock is ready to hand control over to the non-protected firmware. The term 'Bootloader', which may completely be contained in the BootBlock, may refer to the function of updating the non-protected firmware.

From a Firmware point of view, the Bootloader design may vary from product to product, for example based on the device MCU (micro controller unit), but also to support the special storage requirements that device has. It may be the Bootloader that protects the Manufacturing Data, the Variable Storage, the Macro data, and the BootBlock itself during a Firmware Update event.

From a Software perspective, the Bootloader features, commands, and functions may be the same from product to product.

Bootloader implementation details will be described below with reference to Freescale and NXP designs.

For example, a firmware update according to various embodiments may provide the following:

Protected Firmware execution from Reset vector to device Firmware handoff;
Recover from a lost power at any point in update procedure;
Enter Bootloader mode without user intervention;
Verification that the device is in Bootloader mode;
Prevent a device from being programmed with the wrong Firmware;
Recover even if the device was programmed with the wrong Firmware;
Automatically switch device out of Bootloader after update;
Verification that the device is in Normal mode;
Manufacturing Data protection (serial number, calibration data, etc.);
Variable Storage protection (Profiles, ProfileIdx, Lighting, CloudCtrl, etc.); and
Macro Information protection (Macro Directory and Macro Data structures).

In the following, a firmware update event will be described.

In the following, it will be described how the Firmware Updater (which may be or may include a dedicated device or a PC-based application) and the Bootloader (which may be or may include protected Firmware) work together to allow the Device Firmware ("Device Firmware" or "firmware data" may refer to the Firmware that performs the product's main function; for example, Mouse Firmware may handle all button and movement events) to be updated in the field.

The basic premise of the Bootloader design according to various embodiments is to ensure that there is no way, no matter what occurs during the Firmware Update, that the device function is lost permanently. All possible error conditions and power outage conditions are recoverable.

Figure 7:
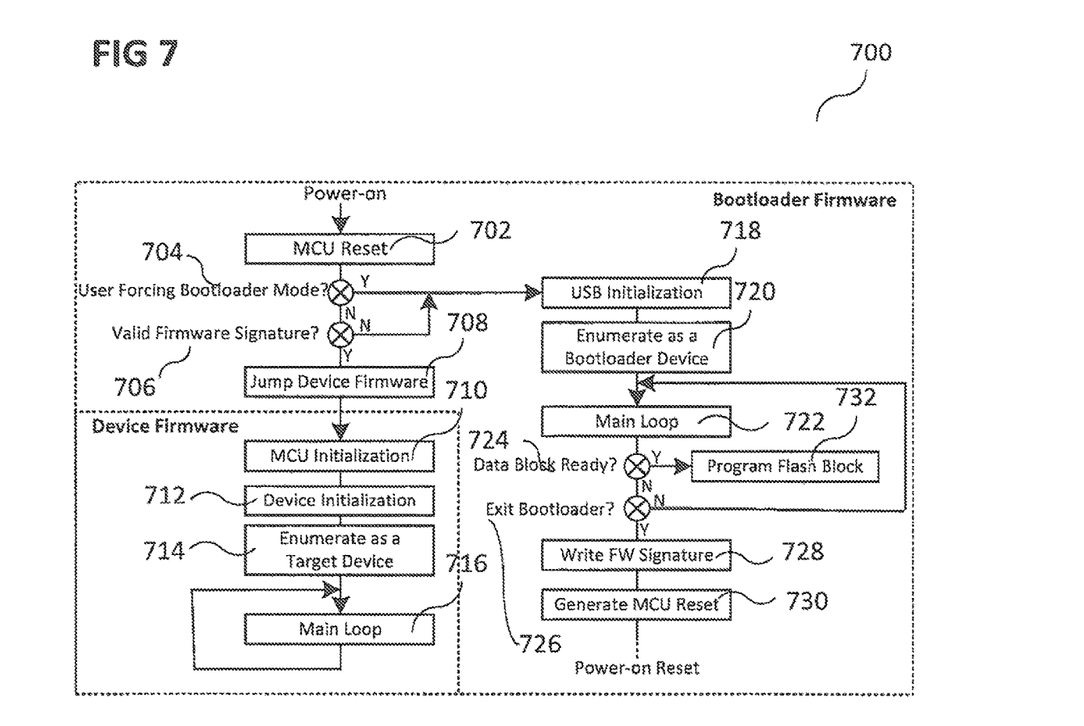
FIG. 7 shows s flow diagram illustrating a method for controlling a device in accordance with an embodiment.

FIG. 7 shows s flow diagram 700 illustrating a method for controlling a device in accordance with an embodiment. In the bootloader to device firmware flowchart 700, processing of the bootloader firmware (which may also be referred to as bootloader) and the device firmware (which may also be referred to as firmware data) will be described.

FIG. 7 shows the Bootloader and Device Firmware Power-On flow. The Bootloader Firmware may be protected and unchanging, and the Device Firmware may be the object of update when in Bootloader Mode.

On boot (for example after power, on), a MCU (micro controller unit) reset may be performed in 702, and the Bootloader may check for the user forcing Bootloader Mode in 704 or for a invalid Device Firmware Signature 706. If either of these conditions exists, then the Power-On flow may go to Bootloader device being enumerated in 720 instead of the Target Device being enumerated in 714. From the System's point of view, there may be a non-HID device that is a Bootloader attached (no Mouse, Keyboard, Headset, etc.).

In more detail, in 704 it may be checked whether the user is forcing a bootloader mode. If yes, processing may proceed in 718; if no, processing may proceed in 706. In 706, it may be checked whether the firmware is valid, for example whether the firmware signature is valid. If no, processing may proceed in 728, if yes, processing may proceed in 708. In 708, processing may jump to the device firmware. In 718, USB initialization may be performed.

Once in Bootloader Mode, the device may wait for flashing commands from the Firmware Updater (FWU) application (which may also be referred to as updater). The FWU may erase, program, and verify blocks of Flash in 732. In more detail, in a main loop 722, it may be checked in 724, whether a data block is ready. If yes, processing may proceed in 732; if no, processing may proceed in 726. In 726, it may be checked whether to exit the bootloader. If yes, processing may proceed in 728; if no, processing may proceed in 722. The Bootloader may protect required areas transparently to the Firmware Updater application. In other words, the FWU application may request to erase blocks of memory starting from address 0 and the Bootloader may allow or block that activity depending on which areas are protected.

Once the FWU is ensured that the Device Firmware has been successfully programmed, only then does the FWU issue the Exit Bootloader command which the Bootloader Firmware finalizes the Target Device Firmware updating checksums and signatures as required in 728, and then it may force a MCU reset in 730, which may trigger the Power-On startup flowchart. If the Firmware update was successful, the Device may boot up and enumerate as the Target Device with the associated functionality. The Bootloader configuration then may completely be suppressed.

In the device firmware, in 710, MCU initialization may be performed. In 712, the device may be initialized. The main loop may be performed in 716.

Figure 8:
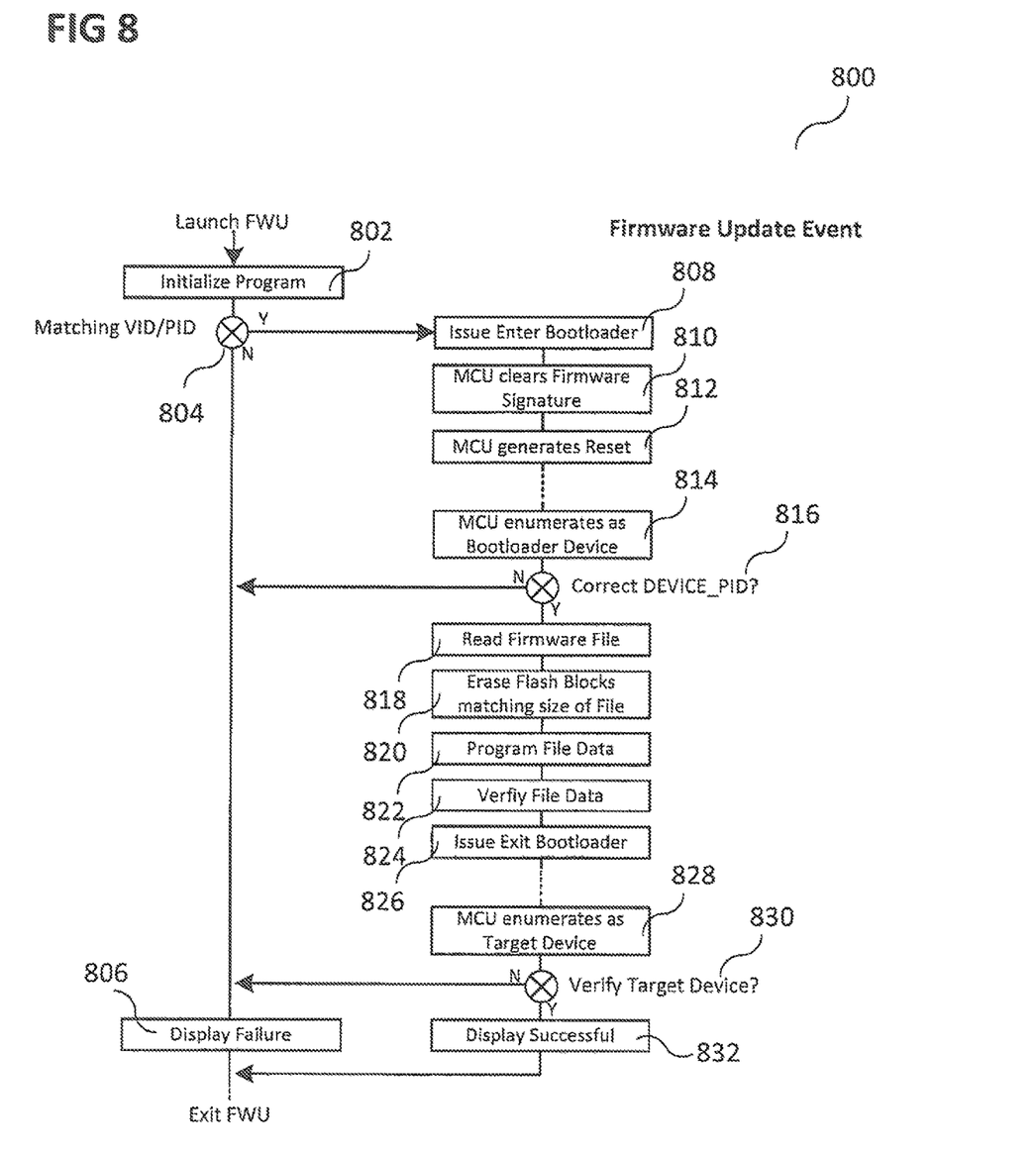
FIG. 8 shows a flow diagram illustrating a method for controlling an updater in accordance with an embodiment.

FIG. 8 shows a flow diagram 800 illustrating a method for controlling an updater in accordance with an embodiment. In the firmware updater flowchart 800, processing of a firmware update event is shown, which may involves both the Firmware Updater application and the Firmware of the Target Device. To be complete, there may be also drivers for both the Protocol (which may be used to communicate to the devices) and for the Bootloader (which may be used to communicate to the Bootloader). The Firmware Updater may be launched as a standalone application or as part of a "cloud" engine support.

When the Firmware Updater is launched, it may always be with a specified VID/PID (vendor identifier/product identifier), because the Firmware it has may be associated with only a particular Device Firmware. After the initialization of the program in 802, once the VID/PID is verified, the Firmware Version number is retrieved and checked in 804 to see if the Firmware has already been updated to the same level or warn the user if the Device Firmware is actually newer than the Firmware to be programmed.

Over the protocol, the Device may be put into Bootloader Mode in 808, which may force the device to reset in 812 and be re-enumerated (for example by the operating system, for example by Windows) as the Bootloader Device in 814. Furthermore, the MCU may clear the firmware signature in 810. In 816, it may be determined whether a correct device PID is present. If yes, processing may proceed in 818; if no, processing may proceed in 806. The FWU may wait until the Bootloader Device has been detected before continuing. The FWU then may read the new Firmware File in 818 and may program the Device to match (for example Erase in 820, Program in 822, and Verify in 824), and once completed, it may issue the "Exit Bootloader" command in 826. The Exit Bootloader command may complete the Firmware update process and may force another reset and re-enumeration in 828 allowing the Device to once again be detected by the operating system (for example Windows) as the Target Device with the associated functionality. In 830, the target device may be verified. If yes, an indication of a successful operation may be displayed in 832. If no, processing may proceed in 806. In 806, an indication of a failure may be displayed. After 806 or 832, the FWU may be exit.

In the following, bootloader design details will be described.

The BootBlock may be a small yet fully functional USB device that may be enumerated as a "Unknown Device" with a USB Descriptor like shown in Table 1.

TABLE 1

| | | BootBlock USB Device Descriptor | |
|---|---|---|---|
| Offset | Field | Value | Description |
| 0x00 | bLength | 18 | Size of the Descriptor in bytes |
| 0x01 | bDescriptorType | 0x01 | Device Descriptor ID |
| 0x02 | bcdUSB | 0x0002 | USB Spec Release Number in BCD format (2.0) |
| 0x04 | bDeviceClass | 0x00 | Class Code - USB.ORG (if 0, interface specifies its own class code) |
| 0x05 | bDeviceSubClass | 0x00 | Subclass Code - USB.ORG |
| 0x06 | bDeviceProtocol | 0x00 | Protocol Code - USB.ORG |
| 0x07 | bMaxPacketSize | 16 | Maximum packet size for Endpoint 0 |
| 0x08 | idVendor | 0x1532 | Vendor ID |

TABLE 1-continued

BootBlock USB Device Descriptor

| Offset | Field | Value | Description |
|---|---|---|---|
| 0x0A | idProduct | 0x110D | Product ID (Bootloader ID) |
| 0x0C | bcdDevice | DEVICE_PID | Device Release Number (repurposed to beDevice PID value) |
| 0x0E | iManufacturer | 0x01 | Index of Manufacturer String Descriptor |
| 0x0F | iProduct | 0x00 | Index of Product String Descriptor |
| 0x10 | iSerialNumber | 0x00 | Index of Serial Number String Descriptor |
| 0x11 | bNumConfigurations | 0x01 | Number of Possible Configurations |

This USB Descriptor may include the DEVICE_PID of the target device, which may allow verification of the device even if the device is already in Bootloader mode.

The USB String Descriptor may be repurposed to give some information to the Firmware Updater about the type of Memory Map or other special variations that the Bootloader wants to communicate on how to proceed with the updating. Table 2 shows that boot block USB string descriptor.

TABLE 2

BootBlock USB String Descriptor

| Offset | Field | Value | Description |
|---|---|---|---|
| 0x00 | bLength | 4 | Size of the Descriptor in bytes |
| 0x01 | bDescriptorType | 0x03 | String Descriptor ID |
| 0x02 | bVersion | 0xNN | (repurposed) Bootloader firmware version number |
| 0x03 | bType | 0xNN | (repurposed) Flash format identifier (example: 0x04 = 4K block, 256 bytes at a time, 256 boundaries) |

There may be only a handful of standard USB commands that the Bootloader device responds to, as Firmware space is very limited. There may be another equally small set of commands to handle the Firmware Update, verification, and the switching back to normal device operation mode.

In the following, flash data storage according to various embodiments will be described.

The device may be desired to manage and protect at a minimum three different areas of Flash: the Manufacturing Data, the Variable Storage, the BootBlock, and optionally the Macro Information.

The Manufacturing Data may be a block that may be only updated in the factory and may be desired to be maintained for the life of the device. The Manufacturing Data may include information such as: Serial Number, Keyboard Layout, Tri-Color LED Calibration values, etc. In the Freescale design, the Manufacturing Data may be just another Flash page, therefore it may be placed anywhere.

Figure 9:
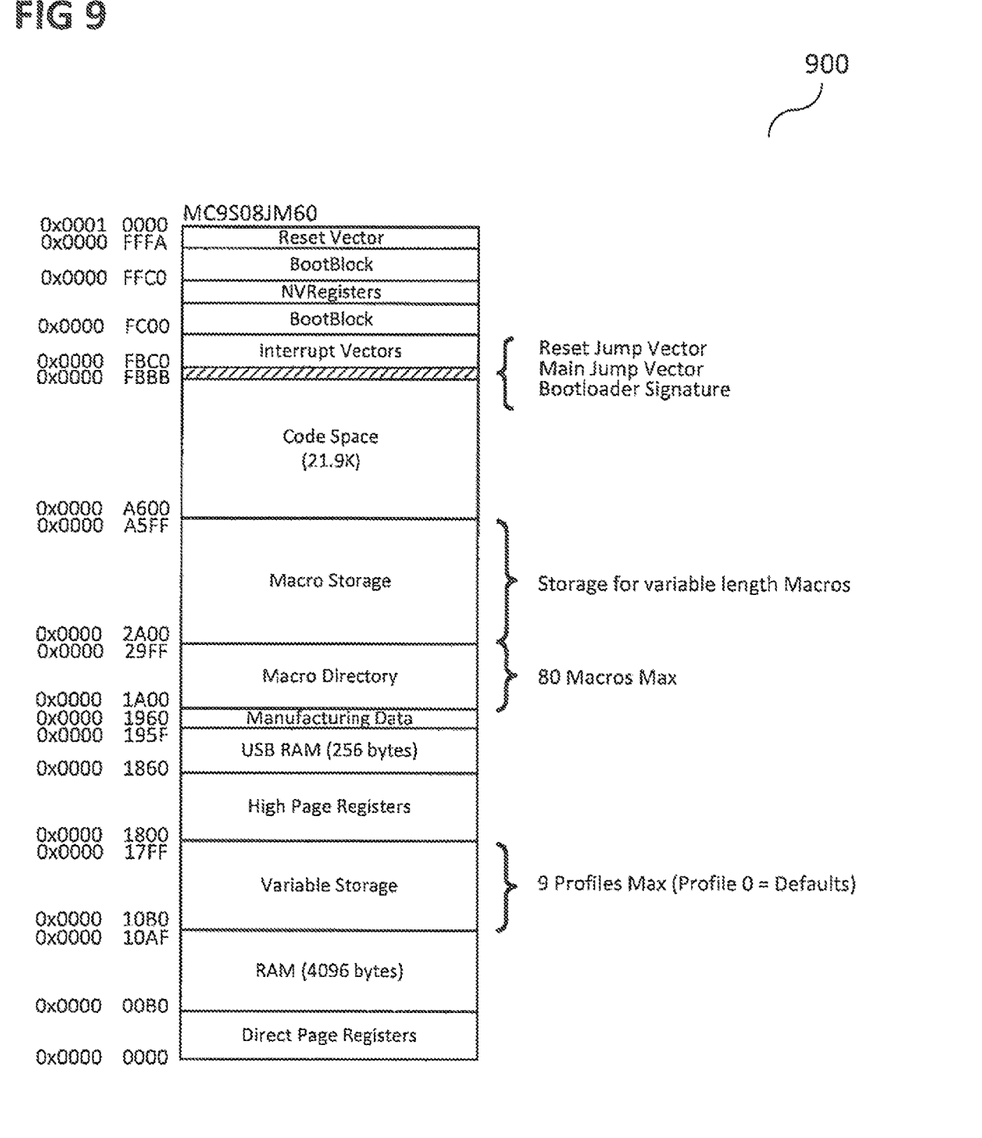
FIG. 9 shows a memory map in accordance with an embodiment.

FIG. 9 shows a memory map 900 in accordance with an embodiment, for example a MC9S08JM60 memory map.

Figure 10:
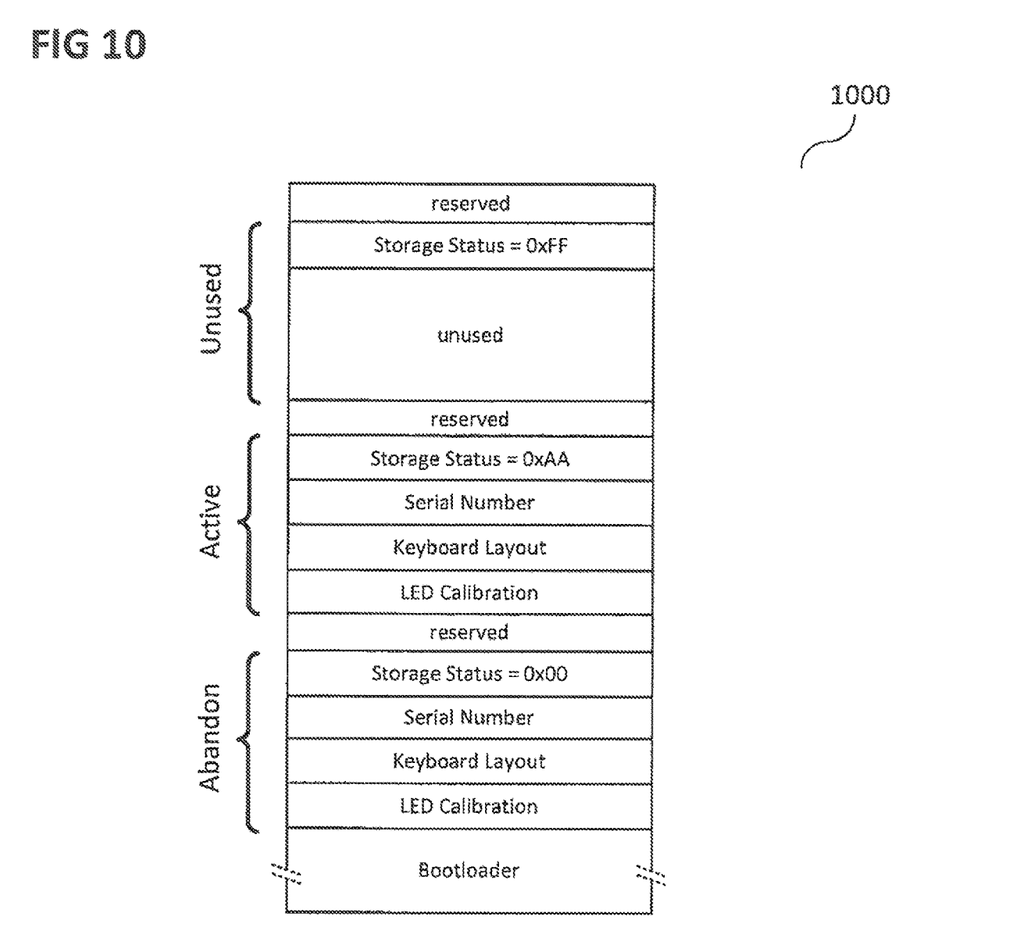
FIG. 10 shows a data storage in accordance with an embodiment.

FIG. 10 shows a data storage 1000 in accordance with an embodiment, for example a NXP manufacturing data storage.

Figure 11:
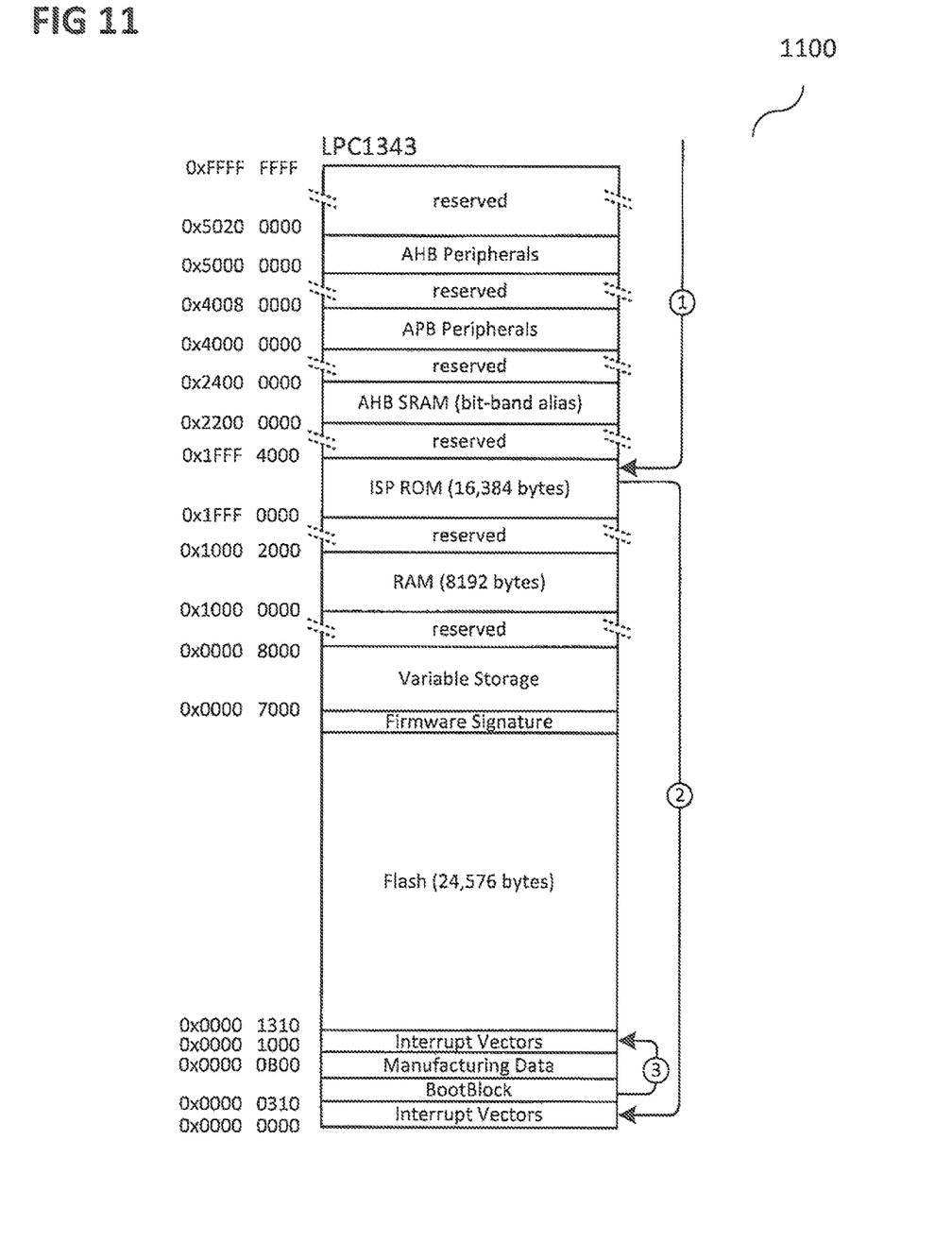
FIG. 11 shows a memory map in accordance with an embodiment.

FIG. 11 shows a memory map 1100 in accordance with an embodiment, for example a NXP LPC1343 memory map.

In the example shown in FIG. 11, the Manufacturing Data may have been stuck in the partial page a 0x1960-0x1A00. Since there may be not much Manufacturing Data to be stored, this may be an efficient method to handle it on the Freescale JM60 design. Also illustrated in this figure is the Macro Storage located between 0x2A00-0x5A00 addresses. Storing Macros and more than one Profile may be a product option. Various devices and methods according to various embodiments may rely on a cloud service to store the macros and other profiles in the "cloud" and so this additional Bootloader Flash protection may not be needed.

However for the NXP design where all Flash pages may be 4K in size, this may be a very wasteful way of implementing the Manufacturing Data storage. So instead, the Manufacturing Data may be stored in the unused portion of the BootBlock, as shown in FIG. 10. Unlike the Freescale approach, this implementation may only be updated a limited set of times. As shown above, Manufacturing Data blocks may be written into the un-programmed backend of the BootBlock, and then abandoned when a new version of the data is written. This may continue until all blocks have been abandoned except the last one, which may allow for example about 20 updates.

The Variable Storage may be implemented on both processors as a group of consecutive Flash pages (to the nearest page). In the Freescale designs, for Flash efficiency reasons, the Variable Storage may not be stored at the top of the memory map, as there are Freescale structures like the Interrupt Vectors that cannot be moved. As shown above, it may be seen that Flash block between 0x10B0-0x17FF is an ideal space for the Variable Storage. Likewise in the NXP designs, the Interrupt Vectors may be at the bottom and therefore the top of memory map may be the most efficient place to store the Variable Storage, like may be seen from the figure showing the NXP memory map.

The Macro Information may follow the Variable Storage ideas, except that it may be a larger block of Flash. Just to hold the directory information entries for 80 Macros may require 4K of Flash. The Macro Directory entry may include the Macro ID, the Macro Data starting and ending address, and the Macro name (20 Unicode characters, NULL terminated):

```
typedef struct _MACRO_DIR {   // Macro Directory Entry structure
    U16 id;                    // Macro ID value
    U32 addr;                  // Macro Starting address
    U32 end;                   // Macro Ending address
    U16 name[20];              // Macro Name (Unicode +
                               // NULL terminated)
} MACRO_DIR;
```

This may allow the Macro data to start and end on any byte regardless of the Flash page boundary. However, to manage this type of Macro Directory structure may require all Macro data to be defragmented after every Macro delete. This may leave the largest unused portion available for Macro Data storage. All unused Macro storage may be erased but not programmed, allowing for the Macro data to be directly written to the Flash as it comes it from the protocol commands.

In the following, switching to bootloader mode will be described.

Various devices and methods according to various embodiments for both NXP and Freescale processors may switch to Bootloader mode and back without involving the Manufacturing Data or the Variable Storage. This isolation may be desired as devices in the field would get stuck in Bootloader mode, for example because power was removed during a Variable Storage update event. These Variable Storage update events may be performed in stealth so the user may not know it is a bad time to unplug the device or shutdown the system.

It may be still a basic requirement of the Bootloader to be able to recover if a power outage occurs and any point during the Firmware Updater procedure. To meet this requirement, there may be a Flash flag that is checked on every boot to determine if the device should re-entry Bootloader mode or not.

According to various embodiments, the very last byte of device code may be the Bootloader state flag. The implementation between the two processors may vary a bit because of the different Flash capabilities. The NXP Flash may be able to AND '1' bits to '0' to create a different variable without erasing the whole page:

```
#define DFU_SIGNATURE   0x12305670   // Enter DFU Mode
                                     signature value
#define STD_SIGNATURE   0x12345678   // Standard device signature
                                     value
```

The last variable (just below Variable Storage—see the NXP LPC1343 Memory Map as described above) in the NXP device Firmware may be set to STD_SIGNATURE, the device code ANDs the STD_SIGNATURE to DFU_SIGNATURE to switch to Bootloader mode. During the Firmware Update process, the STD_SIGNATURE may be erased to 0xFFFFFFFF, but it is not until it is reprogrammed to STD_SIGNATURE that the next boot may go to device Firmware.

The Freescale Flash design may only allow any Flash location to be programmed once after an erase Flash page event. This may pose an additional challenge since of the two values that the variable can take on, one of them must be 0xFF, which may be the exact same value after the erase Flash page event occurs:

```
#define DFU_SIGNATURE   0xF8   // Enter DFU Mode signature value
#define STD_SIGNATURE   0xFF   // Standard device signature value
```

So, the STD_SIGNATURE may be qualified by another variable in the same Flash page of STD_SIGNATURE variable that is always defined by the Firmware to be 0xAA. Standard mode may be only valid if the qualification variable is 0xAA and the STD_SIGNATURE is 0xFF. Again, this may guarantee that the Boot Flag is set to BOOTLOADER_MODE until the last byte of Firmware is programmed.

In the following, storage update will be described.

As part of this enhancement process, the updates to each of the different storage types may be logically isolated. This may help to guarantee that if a state changes accidentally, it may be corrected because the intent of the update is preserved. A one-shot timer may be used to allow multiple protocol changes to be grouped together in a single Flash update event, instead of each of the many commands that are issued one after another having a corresponding Flash update event. In addition, the update to the Variable Storage may not occur unless the data being written is actually different from what is currently stored in Flash. The devices may be often asked to store the same data as they were ask to store on the last boot.

In the following, a freescale flash update note will be described. When converting the addresses from the .S19 file to Flash pages to erase, normally one may use the beginning address ANDed with 0xFE00 to determine the Flash page to erase. The Freescale JM60 part may have two interesting partial Flash pages that may desire care when specifying the page to Erase. The first partial Flash page may be the page from 0x10B0 to 0x11FF, which may allow the page to be erased with the 0x1000 address, fitting the above scheme for determining the erase address. The second partial Flash page may be the page from 0x1960 to 0x19FF, which may only allow an address of 0x1960 to erase it (an address of 0x1960 ANDed with 0xFE00=0x1800, will not work). It is to be noted that for Freescale firmware, the very last byte of Device Firmware may be left undefined, forcing a break in the .S19 output file immediately before the BootBlock. Firmware may not support a block program across unprotected and protected areas of Flash.

In the following, a NXP flash update note will be described. Because there may be quite a bit more code space available in the BootBlock to support the Bootloader on the NXP processors, the code may convert the Freescale type of programming into support that matches needs of the NXP processors. For example the NXP may desire 256 bytes to be written at once at a minimum. It also may desire that the 256 bytes be written on a 256-byte boundary.

The Freescale type of programming may believe Flash pages are every 512-byte address, instead of every 4096-byte address, so the NXP code may check if the page has been erased and may skip subsequent request. The Freescale type of programming may try to program 8-bytes at a time. The NXP code may align all writes to 256-byte boundaries and may buffer the data until the minimum amount of data is available to write.

If these emulation enhancements were not made, then the Firmware Updater would carry different programming algorithms for each processor.

In the following, 32-Bit bootloader support will be described.

Various devices may no longer be limited to 64K of address space and therefore the 16-bit address may be no longer adequate to allow the Firmware to be properly updated. According to various embodiments, a 32-bit format may be provided that is backwards compatible with the 16-bit Bootloader, so only one Firmware Updater application needs to be used across all devices.

The first change may be that the USB String Descriptor 'bType' value may be set to 0x05 indicating a 32-bit address space along with a 4K Erase sector size, a 256 byte program alignment requirement, and a programming block size of 256 bytes. Currently, a 'bType' value of 0x04 may be a 16-bit address space, 4K Erase sector, 256-byte aligned, and 256 byte in size programming block. As described in more detail below, the commands may be changed to work on both 16-bit and 32-bit Bootloaders, and in fact these commands may work on previous versions of the Bootloader without any changes. However, there may be still one reason the FWU application might have to read this USB String Descriptor 'bType' value, and that may be to know how far to continue programming the device (especially if the input is a binary file, which in has to be in some cases if the code image is manipulated by some tool outside the compile/link process).

The 32-bit enhancement may be able to be backwards compatible, because the USB Setup Header packet may be in Little-Endian format and the Ending Address value may be never used.

Table 3 shows a 16-Bit bootloader USB setup header.

TABLE 3

| 16-Bit Bootloader USB Setup Header | | | | | | | |
|---|---|---|---|---|---|---|---|
| Byte 0 | Byte 1 | Byte 2 | Byte 3 | Byte 4 | Byte 5 | Byte 6 | Byte 7 |
| Destination | Command | Starting Address | | Ending Address | | Payload Size | |

In the following, the bootloader device according to various embodiments will be described. When a device is placed in Bootloader mode it may be re-enumerated as a Bootloader Device. This Bootloader Device may be limited in its function, and may only support the minimum set of commands to get pass USB enumeration and then to handle the Firmware Update. This device may be no longer a device which supports an enhanced protocol.

Once the protocol command to enter Bootloader Mode has been issued and the proper amount of time has elapsed allowing to the device to go through Reset and Re-enumeration, the Firmware Updater may use the VID and PID to verify that device is in Bootloader mode (for example 0x1532, 0x110D). Since multiple devices may be attached to a system at any one time (and all may be in Bootloader mode, which may be not likely but possible), the Firmware Updater may read the original DEVICE_PID value in the Bootloader Device Descriptor and may compare it to the desired target device.

As a bootloader device, the following minimum set of USB commands may be supported:
GET_STATUS (0x00);
SET_ADDRESS (0x05);
GET_DESCRIPTOR (0x06);
GET_CONFIGURATION (0x08); and
SET_CONFIGURATION (0x09).

The Firmware Updater application may use USB control transfers to issue the Bootloader device commands.

Table 4 shows a bootloader USB setup header.

TABLE 4

| Bootloader USB Setup Header | | | | | | | |
|---|---|---|---|---|---|---|---|
| Byte 0 | Byte 1 | Byte 2 | Byte 3 | Byte 4 | Byte 5 | Byte 6 | Byte 7 |
| Destination | Command | Starting Address (Little-Endian) | | | | Payload Size | |

As shown in Table 4, the USB Setup header usage may have been altered to issue 32-bit compatible Bootloader Commands in a very minimalistic way (see Table 3 above). The supported Bootloader commands may be as follows:

PROGRAM (0x81)—Starting address, length, and data;
ERASE_PAGE (0x82)—Page address;
EXIT_BOOTLOADER (0x84)—Performs a USB & device reset;
VERIFY (0x87)—Starting address, length, and data; and
GET_RESULT (0x8F—0x01=Successful, 0xFF=Error.

As previously noted, the NXP Bootloader support may be a bit more sophisticated and may emulate the more constrained Freescale Bootloader support. The Freescale Bootloader support may desire that ERASE_PAGE commands are always on a Flash page boundary (Flash size 0x0200 bytes) with two exceptions. Looking at the memory map of Freescale MC9S08JM60 above, it may be seen that there are two partial Flash pages due to the Freescale placement of Registers/RAM. These Flash pages may be at 0x10B0-0x11FF and 0x1960-0x19FF and may need to be erased by giving the starting address of those pages (0x10B0 and 0x1960). All other erasures may begin on the Flash boundaries (an example erase sequence may be: 0x10B0, 0x1200, 0x1400, 0x1600, 0x1960, 0x1A00, 0x1C00, . . . 0xFE00).

The Erase sequence may include: ERASE_PAGE (start_address) followed by a GET_RESULT command, which may return Success (0x01) or Failure (0xFF). The following ERASE_PAGE example like shown in Table 5 may erase the last 4K block of a 2 MByte part (0x001FF000). Table 6 shows a GET_RESULT command.

TABLE 5

| ERASE_PAGE Command | | | | | | | | |
|---|---|---|---|---|---|---|---|---|
| | Byte # | | | | | | | |
| | 0 | 1 | 2 | 3 | 4 | 5 | 6 | 7 |
| Value (hex) | 40 | 82 | 00 | F0 | 1F | 00 | 00 | 00 |

TABLE 6

| GET_RESULT Command | | | | | | | | |
|---|---|---|---|---|---|---|---|---|
| | Byte # | | | | | | | |
| | 0 | 1 | 2 | 3 | 4 | 5 | 6 | 7 |
| Value (hex) | 40 | 8F | 00 | 00 | 00 | 00 | 01 | 00 |

Program and Verify cycles may be identical taking the same data at the same address, getting the results after each command. The program data may not span across unprotected and protected areas (protected by the Bootloader and are preserved during the erase and program cycles); therefore the .S19 or .HEX files may be parsed line by line sending 16 bytes. Because the size of the line, there may be no benefit to sending larger chunks. The .S19 and .HEX files may be constructed so that there is always a line break between protected and unprotected Flash pages.

The Program sequence may include: PROGRAM (start_address) packet of 16 bytes of data, GET_RESULT, which returns Success (0x01) or Failure (0xFF). The following PROGRAM (Table 7) and VERIFY (Table 8) example may be acting on the last 16 bytes of a 2 MByte-part (0x001 FFFF0).

TABLE 7

PROGRAM Command

| | Byte # | | | | | | |
|---|---|---|---|---|---|---|---|
| 0 | 1 | 2 | 3 | 4 | 5 | 6 | 7 |
| Value (hex) 40 | 81 | F0 | FF | 1F | 00 | 10 | 00 |

TABLE 8

VERIFY Command

| | Byte # | | | | | | |
|---|---|---|---|---|---|---|---|
| 0 | 1 | 2 | 3 | 4 | 5 | 6 | 7 |
| Value (hex) 40 | 87 | F0 | FF | 1F | 00 | 10 | 00 |

The last command to be issued may be the EXIT_BOOTLOADER command (for example like shown in Table 9 below), which may cause the device to be re-enumerated again showing up as a device in device operation mode again.

TABLE 9

EXIT_BOOTLOADER Command

| | Byte # | | | | | | |
|---|---|---|---|---|---|---|---|
| 0 | 1 | 2 | 3 | 4 | 5 | 6 | 7 |
| Value (hex) 40 | 84 | 00 | 00 | 00 | 00 | 00 | 00 |

There may be a Flash flag that may indicate that the device is in Bootloader mode. This flag may only be cleared after successfully being programmed. This flag may be checked on every device boot and the device may go into Bootloader mode if the flag is set. This mechanism may allow the power to be removed at any time (including immediately after the Erase cycle) and for the Device to be recovered by recognizing the device is in bootloader mode and then checking the original DEVICE_PID.

There may also be a user recovery mechanism. If the wrong Firmware has been successfully programmed in the device and it no longer responds to protocol commands, the user may unplug the device, may hold down some key/button combination (for example for a mouse: left, middle, right buttons; for example for a keyboard=Fn-key or other special key) as the device is plugged back in. The firmware updater application may use the original DEVICE_PID value as described above to detect which device is attached and in need of a firmware update.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

The invention claimed is:

1. A system comprising:
   an updater;
   a plurality of devices to be updated; wherein each device of the plurality of devices comprises:
      a bootloader;
      a memory configured to store firmware data for controlling the device;
      a processor configured to operate in a device operation mode or in a bootloader mode;
      an interface;
      a validity checker configured to check whether the firmware data stored in the memory is valid;
      a mode changer configured to change from the device operation mode to the bootloader mode if it is determined that the firmware data stored in the memory is not valid; and
      at least one of a key or a combination of keys configured to invoke a user recovery mechanism when held as the device is plugged into a system;
   wherein in the user recovery mechanism, the processor is configured to operate in the bootloader mode;
   wherein the device operation mode is a mode in which the processor controls the bootloader to load the firmware data stored in the memory;
   wherein the bootloader mode is a mode in which the processor controls the bootloader to send an identifier of the device using the interface, to receive firmware data from the updater using the interface and to store the firmware data in the memory;
   wherein the updater is configured to detect the plurality of devices and determine from the plurality of devices that at least one device is in the bootloader mode and to automatically flash the at least one device in the bootloader mode with a matching firmware;
   wherein each device comprises at least one of an input device or an output device; and
   wherein the firmware data comprises data for controlling the at least one of the input device or the output device
   wherein the bootloader is configured to protect manufacturing data during flashing of a matching firmware by the updater; and
   wherein the manufacturing data includes tri-color light calibration values.

2. The system of claim 1, wherein the bootloader mode is a mode in which the processor does not control the bootloader to load the firmware data stored in the memory.

3. The system of claim 1, wherein the interface comprises at least one of a universal serial bus interface, a Firewire interface, a PS/2 interface, a Thunderbolt interface, a local area network interface, a Bluetooth interface, an infrared interface, a wireless local area network interface or a mobile radio communication interface.

4. The system of claim 1, wherein the bootloader uses data stored in a secured portion of the memory.

5. The system of claim 1, further comprising: a receiver configured to receive an instruction to change from the device operation mode to the bootloader mode.

6. The system of claim 5, wherein the receiver is configured to receive the instruction using the interface.

7. The system of claim 1, further comprising: a receiver configured to receive an instruction to change from the bootloader mode to the device operation mode.

8. The system of claim 7, wherein the receiver is configured to receive the instruction using the interface.

9. The system of claim 1, wherein each device is further configured to determine in which mode to operate at the time of booting the device.

10. An updater comprising:
a receiver configured to receive from at least one device which is in a bootloader mode an identifier of the at least one device;
a sender configured to send to the at least one device firmware data based on the received identifier;
wherein the bootloader mode is a mode in which a processor of the at least one device controls a bootloader of the at least one device to send the identifier of the at least one device using an interface of the at least one device, to receive firmware data from the updater using the interface and to store the firmware data in a memory of the at least one device; and
wherein the updater is configured to detect a plurality of devices to be updated and determine from the plurality of devices that at least one device is in the bootloader mode and to automatically flash the at least one device in the bootloader mode with a matching firmware;
wherein each device comprises at least one of an input device or an output device; and
wherein the firmware data comprises data for controlling the at least one of the input device or the output device
wherein the sender is further configured to send to the at least one device which is in the bootloader mode an instruction for changing to a device operation mode; and
wherein the device operation mode is a mode in which a processor of the at least one device controls a bootloader of the at least one device to load firmware data stored in the memory;
wherein the bootloader is configured to protect manufacturing data during flashing of a matching firmware by the updater; and
wherein the manufacturing data includes tri-color light calibration values.

11. The updater of claim 10, wherein the sender is further configured to send to a device not in the bootloader mode an instruction for changing to the bootloader mode.

12. A method for controlling a system, the method comprising:
controlling a bootloader of at least one device of a plurality of devices to be updated within the system;
controlling a memory of the at least one device to store firmware data for controlling the device;
controlling a processor of the at least one device to operate in a device operation mode or in a bootloader mode;
controlling an interface of the at least one device;
controlling a validity checker of the at least one device to check whether the firmware data stored in the memory is valid; and
controlling a mode changer of the at least one device to change from the device operation mode to the bootloader mode if it is determined that the firmware data stored in the memory is not valid;
controlling at least one of a key or a combination of keys of the at least one device to selectively invoke a user recovery mechanism when held as the at least one device is plugged into a system; and
controlling an updater to detect the plurality of devices to be updated and determine from the plurality of devices that at least one device is in the bootloader mode and to automatically flash the at least one device in the bootloader mode with a matching firmware;
wherein in the user recovery mechanism, the processor is configured to operate in the bootloader mode;
wherein the device operation mode is a mode in which the processor controls the bootloader to load the firmware data stored in the memory; and
wherein the bootloader mode is a mode in which the processor controls the bootloader to send an identifier of the at least one device using the interface, to receive firmware data from the updater using the interface and to store the firmware data in the memory;
wherein each device comprises at least one of an input device or an output device; and
wherein the firmware data comprises data for controlling the at least one of the input device or the output device
wherein the bootloader is configured to protect manufacturing data during flashing of a matching firmware by the updater; and
wherein the manufacturing data includes tri-color light calibration values.

13. The method of claim 12, wherein the bootloader uses data stored in a secured portion of the memory.

14. The method of claim 12, further comprising: controlling a receiver of the at least one device to receive an instruction to change from the device operation mode to the bootloader mode.

15. The method of claim 14, wherein the receiver receives the instruction using the interface.

16. The method of claim 12, further comprising: controlling a receiver of the at least one device to receive an instruction to change from the bootloader mode to the device operation mode.

17. The method of claim 12, wherein the at least one device determines in which mode to operate at the time of booting the device.

18. The method of claim 12, further comprising: determining an identity of a device, of the plurality of devices, that encounters firmware update failure and reviving the failed device automatically by flashing in matching firmware to the failed device.

* * * * *